(12) United States Patent
Berliner (10) Patent No.: US 10,311,517 B1
(45) Date of Patent: Jun. 4, 2019

(54) EXCHANGE-TRADED TBA OPTIONS (71) Applicant: William Stanley Berliner, Westlake Village, CA (US)

(72) Inventor: William Stanley Berliner, Westlake Village, CA (US)

(73) Assignee: William Stanley Berliner, West Lake Village, CA (US)

(*) Notice: Subject to any disclaimer, the term of this patent is extended or adjusted under 35 U.S.C. 154(b) by 0 days.

(21) Appl. No.: 15/874,300

(22) Filed: Jan. 18, 2018

Related U.S. Application Data (63) Continuation-in-part of application No. 15/619,035, filed on Jun. 9, 2017.

(60) Provisional application No. 62/348,047, filed on Jun. 9, 2016.

(51) Int. Cl.
*G06Q 40/00* (2012.01)
*G06Q 40/04* (2012.01)
*G06Q 20/10* (2012.01)

(52) U.S. Cl.
CPC ........... *G06Q 40/04* (2013.01); *G06Q 20/102* (2013.01)

(58) Field of Classification Search
None
See application file for complete search history.

(56) References Cited

U.S. PATENT DOCUMENTS

| | | | |
|---|---|---|---|
| 6,263,321 B1 | 7/2001 | Daugherty, III | |
| 6,304,858 B1 | 10/2001 | Mosler et al. | |
| 6,618,707 B1 * | 9/2003 | Gary | G06Q 40/00 705/36 R |
| 7,519,554 B2 | 4/2009 | Gogol et al. | |
| 7,624,062 B1 | 11/2009 | Kelly et al. | |
| 7,865,426 B2 * | 1/2011 | Volpert | G06Q 40/00 705/35 |
| 8,229,840 B2 | 7/2012 | Jackson et al. | |
| 8,849,712 B2 | 9/2014 | Nyhoff et al. | |
| 9,311,675 B2 | 4/2016 | Labuszewski et al. | |
| 9,317,884 B2 | 4/2016 | Labuszewski et al. | |
| 9,317,885 B2 | 4/2016 | Labuszewski et al. | |
| 9,460,468 B2 | 10/2016 | Boberski et al. | |
| 2002/0026405 A1 | 2/2002 | Haar | |
| 2003/0028476 A1 | 2/2003 | Jenkins et al. | |
| 2003/0125982 A1 | 7/2003 | Ginsberg et al. | |
| 2003/0233307 A1 | 12/2003 | Salvadori et al. | |

(Continued)

FOREIGN PATENT DOCUMENTS

WO 2005069978 A3 4/2005

*Primary Examiner* — Scott S Trotter
(74) *Attorney, Agent, or Firm* — White and Williams LLP (57) ABSTRACT

A computer-implemented method for creating an option on a TBA mortgage backed security, including determining an option position is marked to market daily, where the option position is long or short, determining the option position increased in value by an increased amount on a given day and adding the increased value to a customer's margin account, determining the option position decreased in value by a decreased amount on the given day and subtracting the decreased value from the customer's margin account, and when funds in the margin account are below a predetermined margin requirement, requesting the customer deposit additional funds in the margin account, receiving a request to exercise the option on the TBA mortgage backed security from a customer owning the option on the TBA mortgage backed security.

2 Claims, 10 Drawing Sheets

Trade and Settlement Process for TBA Market (56) References Cited

U.S. PATENT DOCUMENTS

| | | |
|---|---|---|
| 2006/0253355 A1 | 11/2006 | Shalen |
| 2009/0012892 A1 | 1/2009 | Biase |
| 2009/0089197 A1* | 4/2009 | Barker .................. G06Q 40/00 705/37 |
| 2010/0280937 A1 | 11/2010 | Hiatt, Jr. et al. |
| 2011/0078070 A1 | 3/2011 | Barker et al. |
| 2013/0041843 A1 | 2/2013 | Nyhoff et al. |
| 2015/0149340 A1 | 5/2015 | Bixby et al. |
| 2015/0324910 A1 | 11/2015 | Labuszewski et al. |

* cited by examiner

FIG. 1

MBS Market Structure and Participants

*FIG. 2*

Impact of Changes in Rates on Pull-Through Percentage and Hedged Mortgage Pipeline

Assuming $100,000,000 Gross pipeline, all loans to be securitized as Fannie Mae 3.5% TBAs Hedge consists of 75 mm Fannie 3.5% forward contracts (All values hypothetical)

RATES RISE

| Rate Changes (%) | 0.50% | 0.40% | 0.30% | 0.20% | 0.10% | 0% |
|---|---|---|---|---|---|---|
| Pull-Through Rate (%) | 92% | 88% | 85% | 82% | 78% | 75% |
| PT-Adjusted Pipeline (000s) | 92,000 | 88,000 | 85,000 | 82,000 | 78,000 | 75,000 |
| Hedge (000s) | -75,000 | -75,000 | -75,000 | -75,000 | -75,000 | -75,000 |
| Net Position (000s) | 17,000 | 13,000 | 10,000 | 7,000 | 3,000 | 0 |

RATES DECLINE

| Rate Changes (%) | 0 | -0.10% | -0.20% | -0.30% | -0.40% | -0.50% |
|---|---|---|---|---|---|---|
| Pull-Through Rate (%) | 75% | 72% | 68% | 65% | 62% | 57% |
| PT-Adjusted Pipeline (000s) | 75,000 | 72,000 | 68,000 | 65,000 | 62,000 | 57,000 |
| Hedge (000s) | -75,000 | -75,000 | -75,000 | -75,000 | -75,000 | -75,000 |
| Net Position (000s) | 0 | -3,000 | -7,000 | -10,000 | -13,000 | -18,000 |

*Result: Trader must actively trade position to remain hedged*

Impact of Changes in Rates on Pull-Through Percentage and Hedged Pipeline Using Puts

Assuming $100,000,000 Gross pipeline, all loans to be securitized as Fannie Mae 3.5%s Hedge consists of 150 mm of At-The-Money Options on Fannie 3.5% TBAs (All values hypothetical)

RATES RISE

| Rate Changes (%) | 0.50% | 0.40% | 0.30% | 0.20% | 0.10% | 0% |
|---|---|---|---|---|---|---|
| Pull-Through Rate (%) | 92% | 88% | 85% | 82% | 78% | 75% |
| PT-Adjusted Pipeline (000s) | 92,000 | 88,000 | 85,000 | 82,000 | 78,000 | 75,000 |
| Option Delta | -0.62 | -0.59 | -0.57 | -0.55 | -0.52 | -0.50 |
| Hedge Face Value (000s) | 150,000 | 150,000 | 150,000 | 150,000 | 150,000 | 150,000 |
| Delta-Adjusted Hedge (000s) | -93,000 | -88,500 | -85,500 | -82,500 | -78,000 | -75,000 |
| Net Position (000s) | -1,000 | -500 | -500 | -500 | 0 | 0 |

RATES DECLINE

| Rate Changes (%) | 0 | -0.10% | -0.20% | -0.30% | -0.40% | -0.50% |
|---|---|---|---|---|---|---|
| Pull-Through Rate (%) | 75% | 72% | 68% | 65% | 62% | 57% |
| PT-Adjusted Pipeline (000s) | 75,000 | 72,000 | 68,000 | 65,000 | 62,000 | 57,000 |
| Option Delta | -0.50 | -0.48 | -0.45 | -0.43 | -0.41 | -0.39 |
| Hedge Face Value (000s) | 150,000 | 150,000 | 150,000 | 150,000 | 150,000 | 150,000 |
| Delta-Adjusted Hedge (000s) | -75,000 | -72,500 | -67,500 | -64,500 | -61,500 | -58,500 |
| Net Position (000s) | 0 | 0 | 500 | 500 | 500 | -1,500 |

*Result: Trader does not need to actively manage hedge position*

*FIG. 5*

Timelines of Existing and Proposed TBA Options (Using Puts)

1: Current TBA put option (settled through delivery of underlying asset)

* Expiration date will be prior to TBA notification date in order to allow for time to adjust hedges
** Only applicable if option is exercised 2: Proposed cash-settled option

EXCHANGE-TRADED TBA OPTIONS

CROSS-REFERENCE TO RELATED APPLICATION

This application is a continuation in part of U.S. patent application Ser. No. 15/619,035, filed Jun. 9, 2017, entitled "Exchange-Traded TBA Options," which claims the benefit of provisional application Ser. No. 62/348,047, filed on Jun. 9, 2016, the entire contents of which are hereby incorporated by reference.

BACKGROUND

The "To Be Announced" (TBA) market is a market for forward commitments to buy and sell standardized mortgage backed securities (MBS). The market gets its name from the fact that the identity of the actual securities changing hands is not known until just before settlement. The TBA market facilitates trading in fixed-rate MBS created under the auspices of the three agencies, with coupons in even 50 basis point increments (i.e., coupons of 4.0%, 4.5%, etc.) for multiple consecutive settlement months. Monthly settlements take place on days designated by the industry trade association.

Figure 1:
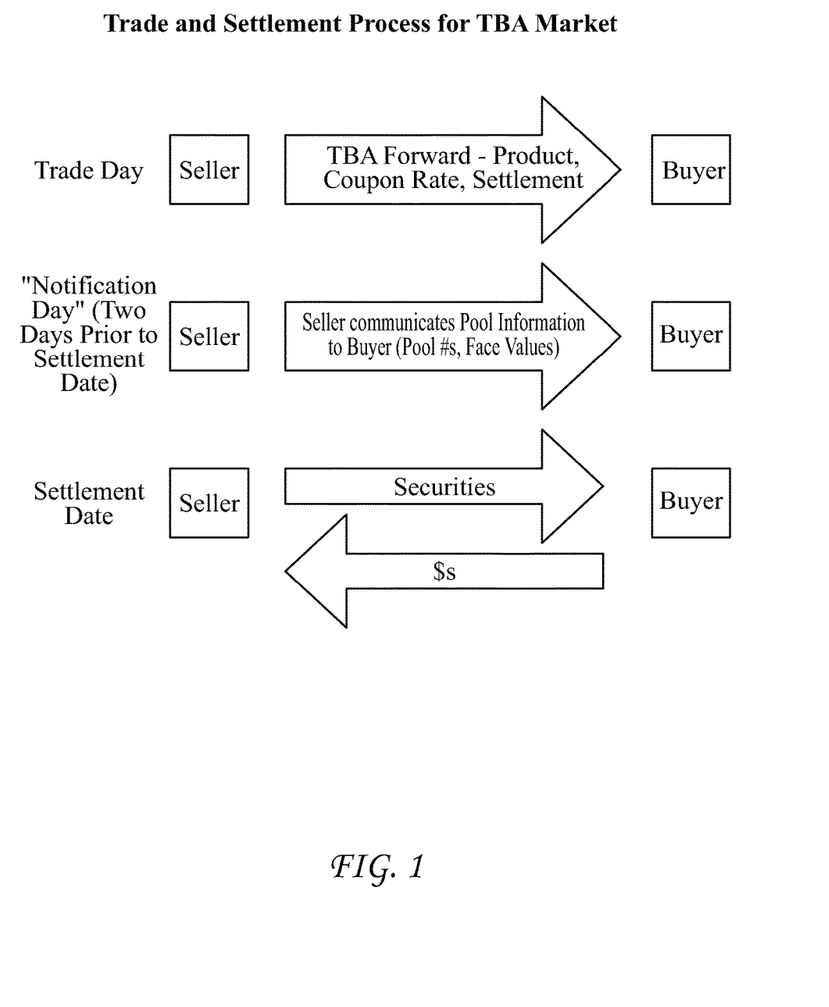
FIG. 1 is a chart showing trade and settlement process for TBA Market.

The actual pools used to satisfy open TBA commitments are created prior to settlement and delivered against the open TBA commitment at settlement. Two business days prior to settlement, the seller provides the buyer with a list of the pools that will be delivered against the TBA commitment. The pools must meet the trade association's specifications for good delivery. These rules dictate the types of pools that can be delivered against a TBA commitment, how many pools can be delivered (typically three pools per million dollars in face value), and the "delivery variance" (i.e., the difference between the face value of pools to be delivered and the TBA commitment size). The pools are then delivered, versus a cash payment, by the seller to the buyer on the settlement date. (See FIG. 1 for a schematic of the trade and settlement processes.) If the information is not conveyed by the cutoff time (3:00 PM Eastern Time) or the information does not meet the trade association's delivery rules, the buyer can refuse to accept delivery of the pools. This eventuality ("failing to deliver") means that the seller must hold the pools until delivery can be affected, incurring both capital outlays and expenses.

The fact that the TBA market allows trading to take place for multiple months' settlement facilitates transactions known as dollar rolls. Dollar rolls (or simply "rolls") are trades where TBAs are bought (sold) for a particular month's settlement and simultaneously sold (bought) for a later settlement.

The TBA market is the primary vehicle for mortgage-backed securities (MBS) trading. Data from the Financial Institution Regulatory Authority (FINRA) indicates that TBA trades regularly constitute more than 90% of all trading in MBS.

The structure of the TBA market reflects the needs of several market segments. Mortgage lenders can use TBA forward commitments to hedge their "pipelines" of loan applications that are in the process of being underwritten, while also monetizing their funded inventories by delivering against their TBAs. Investors also utilize the TBA market to buy and sell MBS pools. Investors" include a variety of market participants that utilize TBA commitments, including money managers, hedge funds, and mortgage servicers. The market is facilitated by Broker/Dealers who act as intermediaries between various counterparties. In order to act as intermediaries, Broker/Dealers must 1) act as a counterparty for lenders and investors looking to buy or sell TBAs (as well as actual pools); 2) accept and deliver pools to fulfil TBA forward trades; and 3) evaluate and manage counterparty credit risk. This requires capital, trading and risk-management personnel, back-office staffing, information and analytical technology, and banking facilities.

Figure 2:
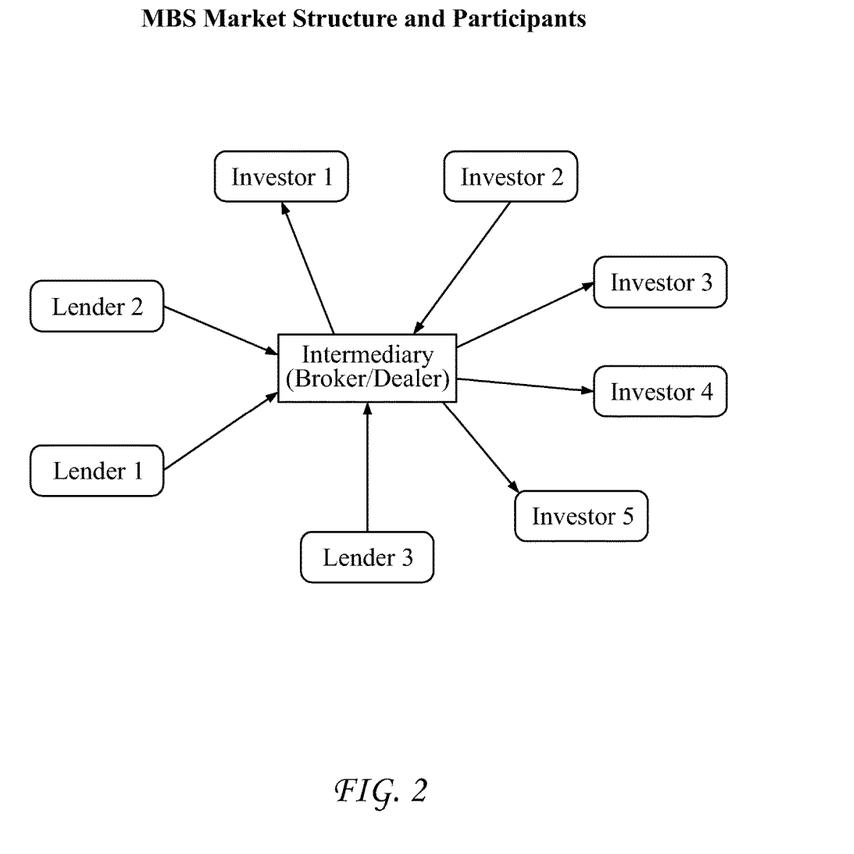
FIG. 2 is a diagram outlining the structure and participants in the TBA Market

FIG. 2 shows a schematic showing the structure of the MBS market and the various participants. Broker/dealers act as market intermediaries. They will take the opposite side of trades from their clients, acting as either an agent (i.e., risklessly) or as a principal (accepting market risk). Lenders typically receive pools from the agencies (Fannie Mae, Ginnie Mae, Freddie Mac) and deliver them to broker/dealers against TBA forward commitments. Lenders typically do not buy TBAs except to close out open short positions; as a result, their inability to take delivery of pools from any counterparty other than the agencies is limited. Investors buy or sell TBAs depending on their investment strategies and tactics, and often receive or deliver pools against TBA obligations. (They also have the option of closing out trades prior to settlement.) As part of the settlement process, broker/dealers receive pools from sellers and re-deliver them to buyers. Acting as a broker/dealer for TBAs requires: Counterparty credit exposure and analysis; Staffing, IT infrastructure, and banking facilities to accept and deliver pools to counterparties; Capital and financing necessary to support a principal trading operation and to fun positions resulting from "fails." Counterparties (i.e., both lenders and investors) typically never interact directly with each other. Reasons include: Operations are simplified by facing a limited number of counterparties; Counterparty credit exposure is limited to a few large, well-capitalized and regulated entities.

The TBA market's structure makes the settlement process for MBS complex and expensive, and errors are common. The following compares the settlement procedures for Treasury futures contracts (traded and settlement through the CME Group) relative to the TBA market.

CBOT Treasury futures are settled by delivering eligible securities against trades for trades open at expiration of quarterly contracts. Eligible securities are delivered through the exchanges clearing bank. Trade prices are adjusted using "conversion factor" for the security delivered. Each contract has a "delivery basket" outlining the securities that can be delivered. For example, the 10-year note future allows delivery of Treasuries with maturities between 6½ and 10-years. For the September 2017 10-year note contract, 16 issues were eligible for delivery. Delivery may occur on any day of the month the contract expires, up to and including the last business day of the month. CME Clearing acts as counterparty on all open transactions, and is responsible for managing client accounts, collecting margin, and managing credit exposure.

TBA forward commitment settlements take place monthly for all coupons and products according to a calendar published by SIFMA. The seller must notify the buyer of the identity and face value of pools to be delivered against open obligations, subject to SIFMA delivery rules. Pools are delivered subject to SIFMA rules that specify a) eligible product groups; b) the maximum number of pools per million to be delivered (3); c) the maximum delivery variance (0.01%). Deliveries that do not meet these rules are not accepted by the buyer and may result in "failing to delivery." More than 37,000 pools can be delivered against Fannie Mae 3.5% TBAs. In 2016 Fannie Mae issued 6,435 pools that are eligible for delivery, with sizes ranging from $57,500 to $26.0 billion. Seller must notify buyer of pool IDs and face values no later than 48 hours prior to settlement (3:00 PM Eastern Time on the assigned settlement date). Broker/dealers serve as counterparties against virtually all trades. They take delivery of pools from accounts selling to them and re-deliver them against their sales, and must fund pools that cannot be delivered by settlement. Broker/dealers also collect margin and manage counterparty credit exposure.

Mortgage lenders and MBS traders often find it convenient and cost-effective to trade options due to the intrinsic nature of the products. Mortgages are noteworthy for having "embedded" options that reflect the borrowers' ability to refinance their loans if rates decline. In addition, mortgage lenders must deal with the possibility that loan applicants will either abandon their applications or negotiate lower mortgage rates if market interest rates decline between the time that their loans' rate is set (or "locked") and the time the loans close. This is referenced as "fallout" and is another form of option embedded in loan applications. Lenders monitor the expected fallout from their pipeline by estimating a "Pull-Through Rate" which estimates the proportion of their pipeline that they expect to close. The Pull-Through Rate for a loan is a function of the current level of mortgage rates (relative to the loan's rate) as well as the underwriting status of the loan. (If a loan is approved and an appraisal has been performed, for example, the borrower is unlikely to seek a new loan irrespective of the level of mortgage rates.) The weighted average Pull-Through Rate for each loan is the Pull-Through Rate for the total pipeline, which dictates the size of the hedges that will be necessary to protect the pipeline's value.

Figure 3:
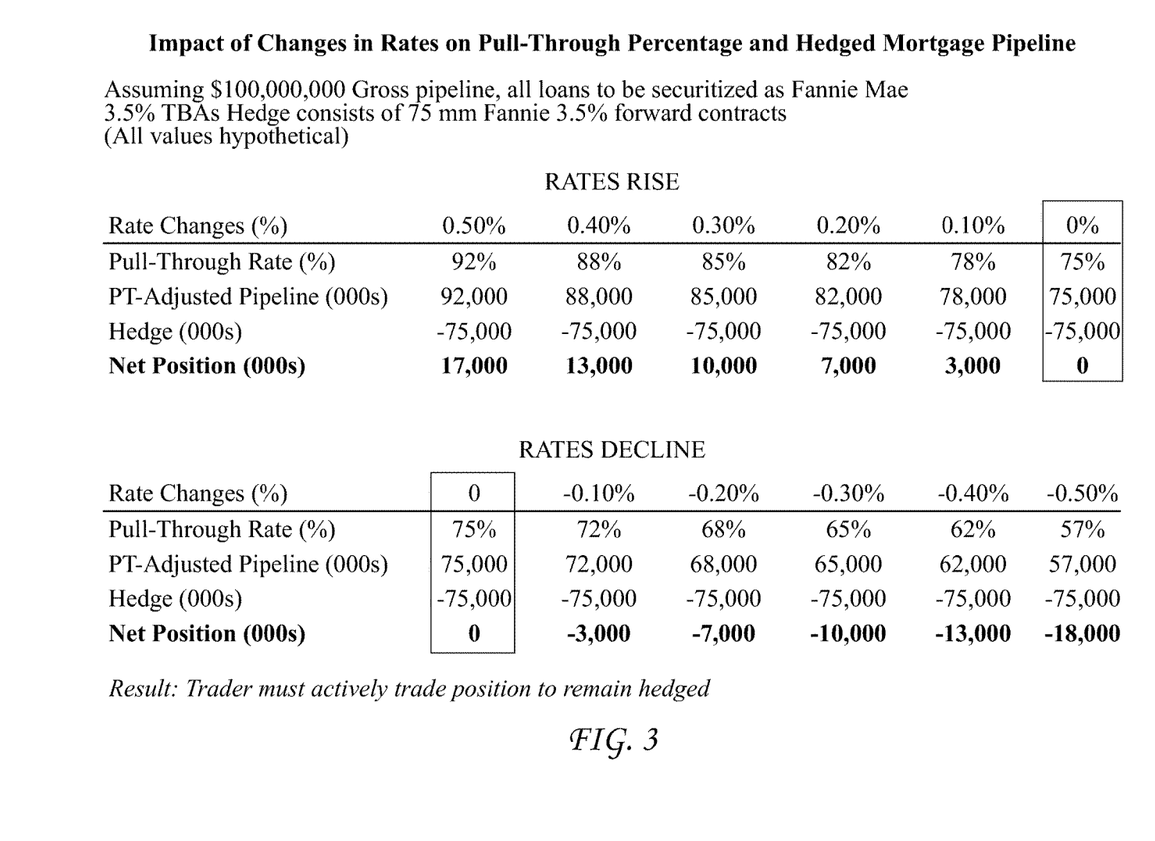
FIG. 3 shows the impact of changing rates on a mortgage pipeline hedged with TBAs due to changes in the expected Pull-Through Rate.
Figure 4:
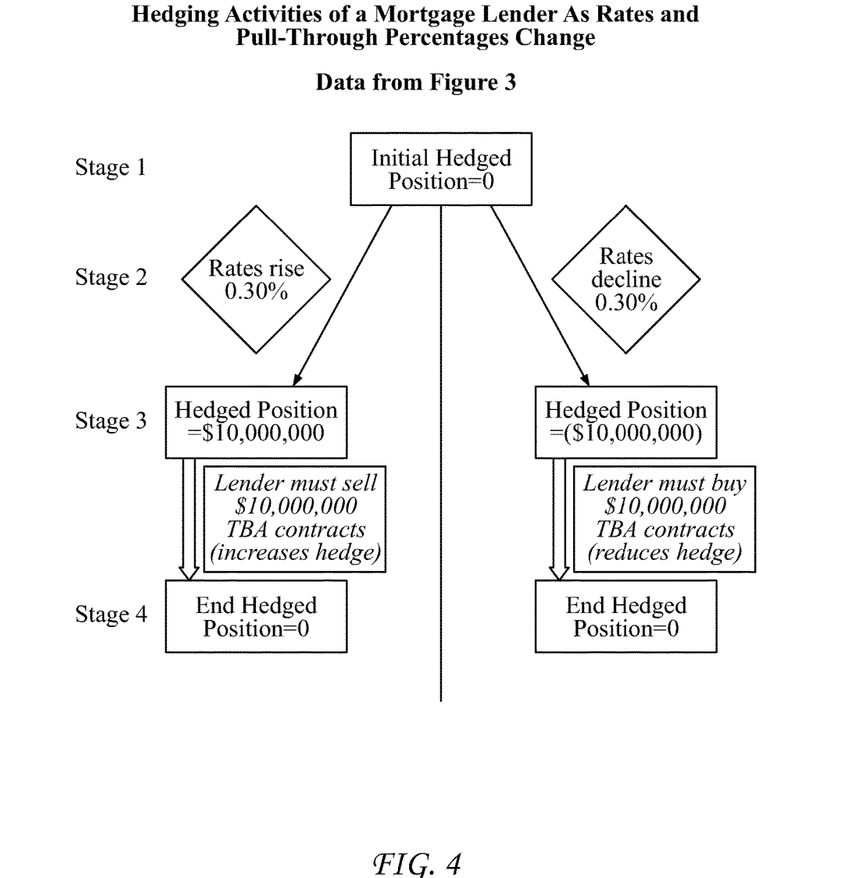
FIG. 4 shows the decision tree of a trader when market rates change by 0.30%.

Changes in expected Pull-Through Rates impact the interest rate risk associated with lenders' pipelines. FIG. 3 contains a hypothetical example of how changes in market interest rates impact a pipeline's Pull-Through Rate and necessitates adjustments to the size of the hedge. As rates change, the pipeline effectively increases in size and risk as the Pull-Through Rate increases; as rates fall, the pipeline's size decreases. This behavior means that the lender must re-size the hedges as rates fluctuate in order to avoid being under- or over-hedged. A decision tree illustrating a trader's thought process is shown in FIG. 4. However, hedging with interest-rate options can offset the impact of changing Pull-Through Rates.

Figure 5:
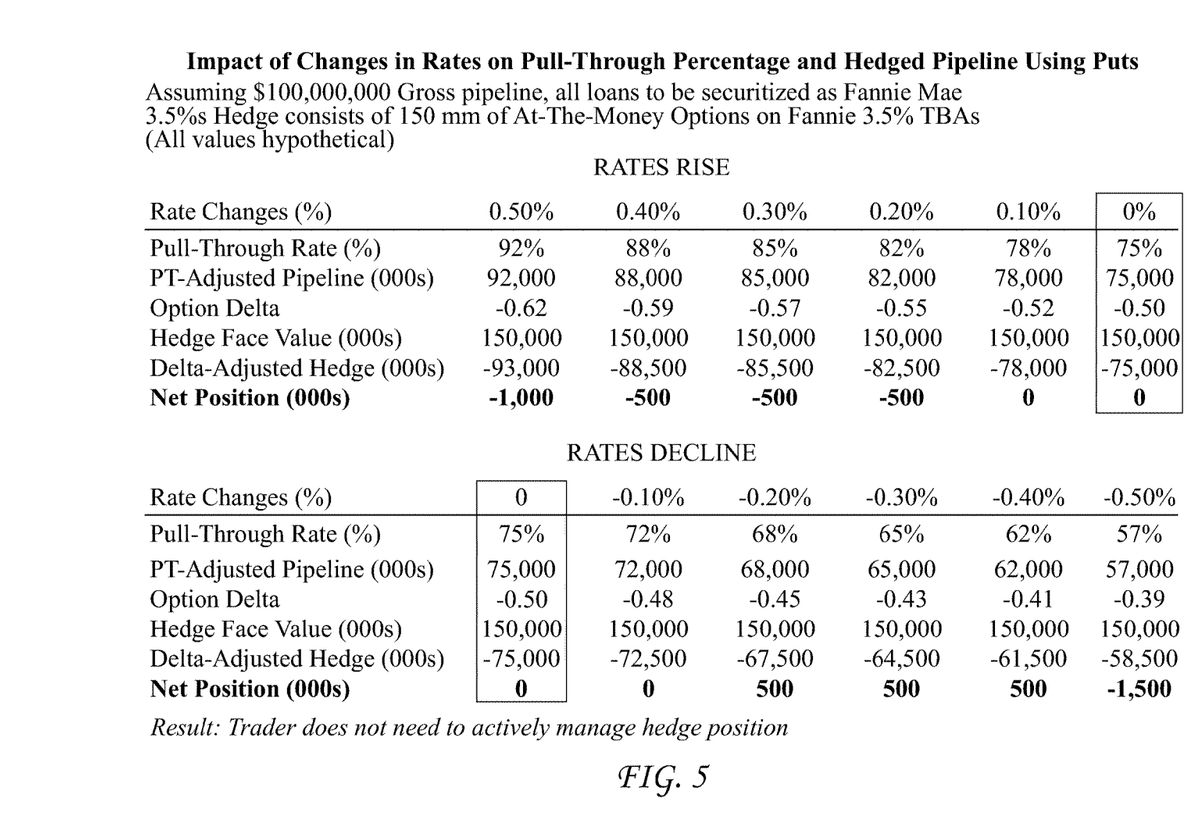
FIG. 5 shows the impact of changing rates on a pipeline hedged with TBA options.

The risk exposures or "deltas" of options change based on changes in market conditions, allowing traders to structure hedges that mitigate much of their exposure to embedded options. Delta is a term that indicates the sensitivity of an option's price relative to price changes in the underlying securities. FIG. 5 shows the profile of a hedged pipeline if put options on Fannie 3.5% s are used as a hedging vehicle. As the table indicates, the lender does not need to actively manage the hedge; the hedge's risk exposure changes with the level of market rates, largely offsetting the impact of the embedded options.

While many MBS market participants can benefit from using options, there are several factors that have prevented them from being widely utilized. Because of the complexities and costs associated with the settlement process, there is currently no exchange-traded market for TBA options. Exchanges do not have the same capital and operational structures as broker/dealers, and are unable to absorb the costs, investment and risks associated with allocating and clearing TBA transactions. For example, consider a case where Investor A was short 100 mm TBAs to the exchange, and the exchange was short 100 mm TBAs to Investor B. This is ostensibly a matched trade; however, if pool information is not conveyed on a timely basis to Investor B the exchange might not be able to re-deliver the pools allocated to it by Investor A. As a result, the exchange would need to both allocate capital and obtain financing in order to hold the 100 mm in MBS. Alternatively, they cannot assign trades to their counterparties (i.e., have their counterparties settle transactions directly) in part because of counterparty credit exposures. As a result, TBA options are traded in an Over-The-Counter (OTC) market offered by a small number of dealers. The market is generally viewed as opaque, expensive, and prone to manipulation, and has not grown or expanded since the 1980s despite the expressed interest of many market participants in utilizing options as a hedging and trading vehicle.

Mortgage and MBS traders seeking to utilize exchange-traded options are currently limited to options on Treasury futures. These are often unsatisfactory vehicles because a) the risk exposures of Treasury futures are different than those of mortgages and MBS; and b) Treasury futures and MBS prices often do not exhibit strong correlation. This "basis risk" is difficult to manage and creates a separate form of exposure that many MBS market participants seek to avoid.

The inability and/or unwillingness of mortgage lenders to utilize interest rate options in their hedging directly impacts their financial performance and, by implication, the mortgage rates they can offer to their customers. If a TBA option existed that addressed the various issues addressed previously, lenders could arguably hedge their pipelines more efficiently and become more competitive in their rate offerings.

Option expirations cannot coincide with the TBA settlement calendar due to the pool notification and delivery requirements associated with TBAs. The options must expire prior to the TBA notification date; there must be a lag between expiration and notification day in order to allow pool information to be exchanged prior to the notification deadline. This creates a separate deadline for lenders and investors that requires additional attention and oversight.

SUMMARY OF THE INVENTION

A computer-implemented method for creating, centrally clearing, and settling an option on a TBA mortgage-backed securities forward contract through a centralized trading platform and central clearinghouse that eliminates the need for delivering or exchanging the TBA mortgage-backed securities forward contract or any mortgage-backed securities upon exercise of the option, the method including: a. receiving at memory from the centralized trading platform a request from a customer to buy or sell the option on the TBA mortgage-backed securities forward contract; b. using the computer processor in communication with memory of the centralized trading platform, electronically automatically determining that an offsetting order to sell or buy the option on the TBA mortgage-backed securities forward contract exists at the same price from a different customer, then; b1) using the computer processor in communication with the memory of the centralized trading platform, electronically automatically buying the option for the customer placing the buy order from the customer placing the offsetting sell order and notifying the customers buying and selling the option that the trade has been executed; b2) using the computer processor in communication with the memory of the centralized trading platform, electronically automatically adding the option to the position account of the customer buying the option; b3) using a computer processor in communication with the memory of the centralized trading platform, electronically automatically determining the total cost of the option purchased by the customer and, when funds in the margin account are below a predetermined amount required to pay the cost of the option, requesting the customer deposit additional funds in the margin account; b4) using the computer processor in communication with the memory of the centralized trading platform, electronically automatically subtracting the cost of the option or options from the customer's margin account; b5) using the computer processor in communication with the memory of the centralized trading platform, electronically automatically determining that the customer that sold the option owned the option in the customer's position account, and reducing the option position in the customer's position account by the amount of the options sold and adding the proceeds of the sale, net of costs, to the margin account of the customer that sold the options; b6) using the computer processor in communication with the memory of the centralized trading platform, electronically automatically determining that the customer that sold the option or options did not own the option sold in the customer's position account and creating in the customer's position account a short position for the amount of the options sold, and adding the proceeds of the sale of the option less any costs and less some predetermined amount of margin retained by the centralized trading platform and central clearinghouse to the margin account of the customer that sold the options; c. using the computer processor in communication with memory of the centralized trading platform, electronically automatically determining that an offsetting order on the same option does not exist at the same price from a different customer on the centralized trading platform and posting the customer's order on the centralized system that displays the order to the centralized trading platform's customers; c1) using the computer processor in communication with memory of the centralized trading platform, electronically automatically determining that a new order to buy or sell the option posted by a different customer represents an offsetting order on the option at the same price, and buying the option for the customer placing the buy order from the customer placing the sell order; and c2) using the computer processor in communication with memory of the centralized trading platform, electronically automatically receiving at memory from the centralized platform instructions from the customer that placed the order to cancel the order, and removing the order posted on the centralized order display system.

BRIEF DESCRIPTION OF THE DRAWINGS

The various embodiments of the present invention now will be discussed in detail with an emphasis on highlighting the advantageous features. These embodiments depict the novel and non-obvious aspects as shown in the accompanying drawings, which are for illustrative purposes only. These drawings include the following figures, in which like numerals indicate like parts.

DETAILED DESCRIPTION OF THE INVENTION

The following detailed description describes the present embodiments with reference to the drawings. In the drawings, reference numbers label elements of the present embodiments. These reference numbers are reproduced below in connection with the discussion of the corresponding drawing features.

The embodiments of the invention of the present disclosure are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

This application relates to exchange-traded option contracts on mortgage-backed security TBA agreements that settle in cash at expiration. The Contract is for options on TBA commitments. Strike prices could be offered either in one-point or half-point increments, depending on market conditions.

Contracts would be offered for actively-traded Fannie Mae coupons for the three settlement months quoted on trading screens by vendors such as TradeWeb and Bloomberg. (These are always represented by the three settlement months directly following any given trading session, as specified by SIFMA's delivery calendar.) The contract would expire at 3:00 PM Eastern time on the SIFMA-designated "notification day" for any given month.

Contracts would be traded for Call and Put options. The option contracts would be structured as American options, exercisable at any time prior to expiration.

Securities or other assets need not ever change hands at or prior to expiration. The contracts would be settled for cash after expiration, as follows: Sellers of Call contracts would pay the Call buyers either (a) the difference between the TBA price at expiration and the strike price, or (b) zero. Sellers of Put contracts would pay the Put buyers either (a)

the difference between the strike price and the TBA price at expiration, or (b) zero. Settlements would be handled by the exchange.

The proposed contracts would be different from traditional options that grant the right, but not the obligation, to buy or sell a designated asset at a designated price prior to the contract's expiration. Depending on the type of option contract traded (i.e., call or put), the proposed contracts would pay out the difference between the price of the asset (i.e., TBA contracts) and the strike price after expiration.

For the purpose of settling contracts at expiration, TBA prices would be determined using prices published by a generally-acknowledged source of market data.

Advantages and Benefits of Contract Structure

Avoiding the complex and difficult operational issues and expenses associated with the TBA settlement process allows the contract to be traded on an exchange. This means that information on pricing, activity, and market size is published and readily available. This in turn is expected to bring in more participants to the market, creating better liquidity and more efficient pricing.

The presence of a transparent and liquid option contract would better allow mortgage originators and investors to trade options as part of their overall hedging and investment strategies. Mortgage lenders that utilize options in their hedging strategies can be expected to hedge their pipelines more effectively and at a lower cost, and such savings may be passed on to consumers in the form of lower mortgage lending rates. It is expected that a liquid and transparent exchange-traded product would also be viewed favorably by regulators, especially those overseeing depository institutions.

The contracts are simple, straightforward and easily managed by lenders and investors.

Figure 6:
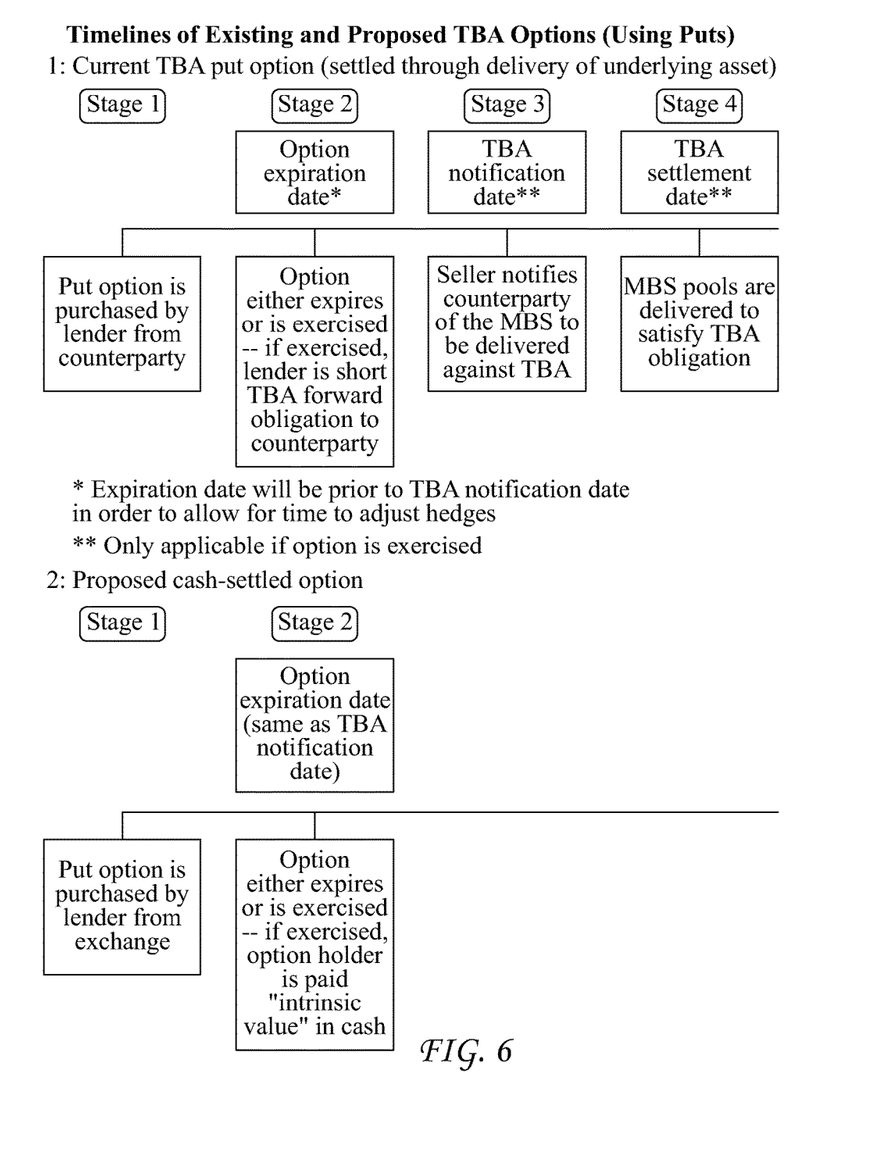
FIG. 6 compares the timelines of existing TBA options with the invention.

Option expirations will coincide with the TBA settlement calendar. FIG. 6 contains timelines comparing the timing of events in the OTC options market relative to those for the proposed contract. Note that the existing TBA options products forces the option holder to either make decisions or take actions at multiple different times after purchase. By contrast, the invention streamlines the process such that no decision or action is required if the option is held to expiration; it either expires worthless or is automatically exercised. This will allow lenders and investors to conveniently manage their option positions in concert with the rest of their TBA positions and/or portfolios. Note also that the existing TBA options force the option expiration to take place prior to notification day, while for the invention the option expiration takes place at the same time as notification.

Figure 7:
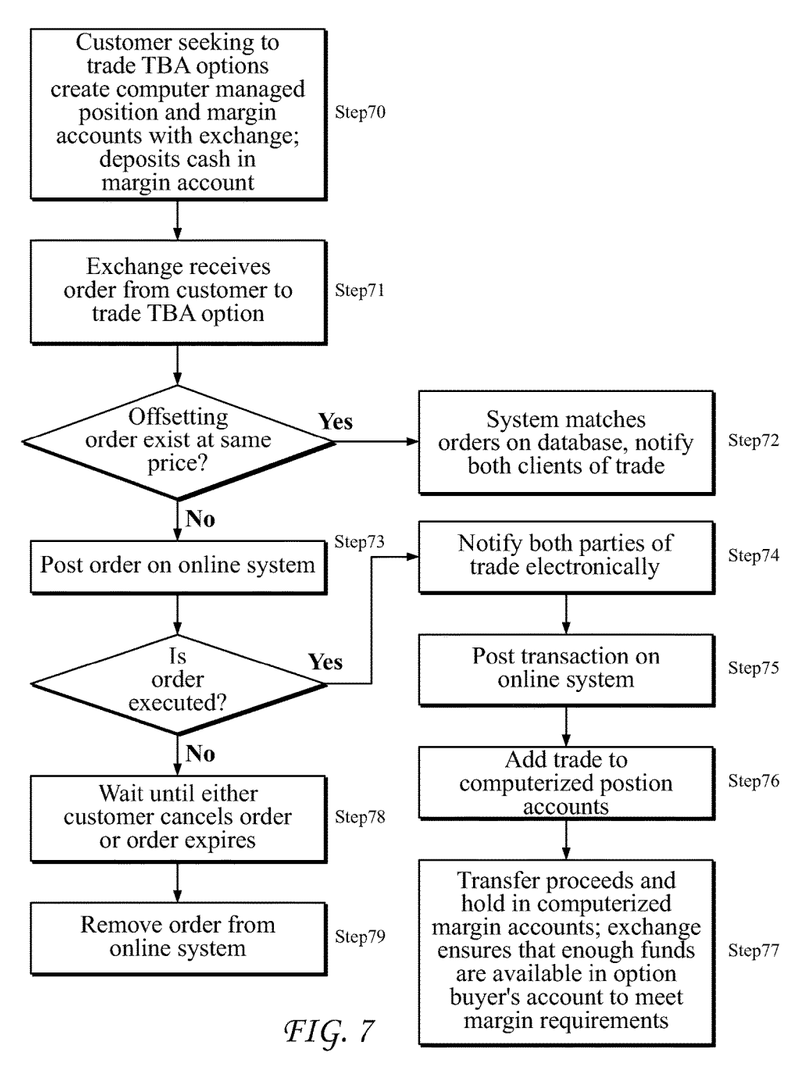
FIG. 7 is a flowchart showing initial stages of actions undertaken by a computer system to trade and manage proposed contracts according to an aspect of the invention of the present disclosure.
Figure 8:
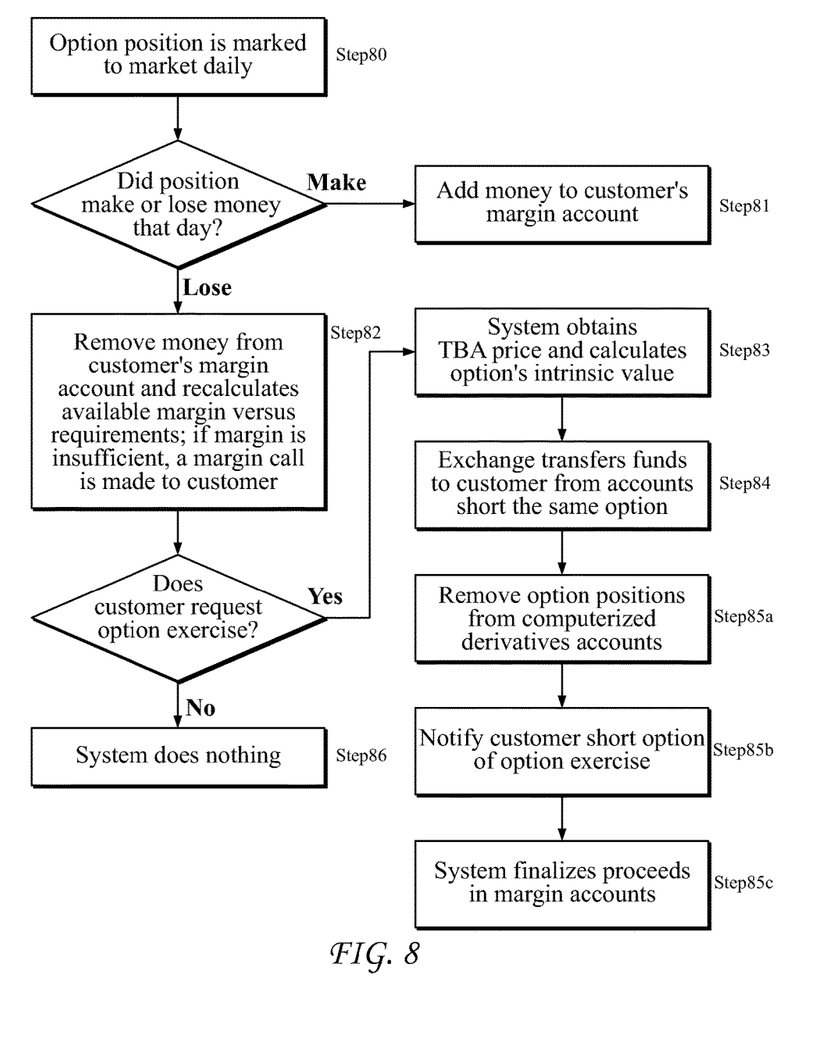
FIG. 8 is a flowchart showing actions undertaken by a computer system to manage proposed contract between trade day and option expiration according to an aspect of the invention of the present disclosure.
Figure 9:
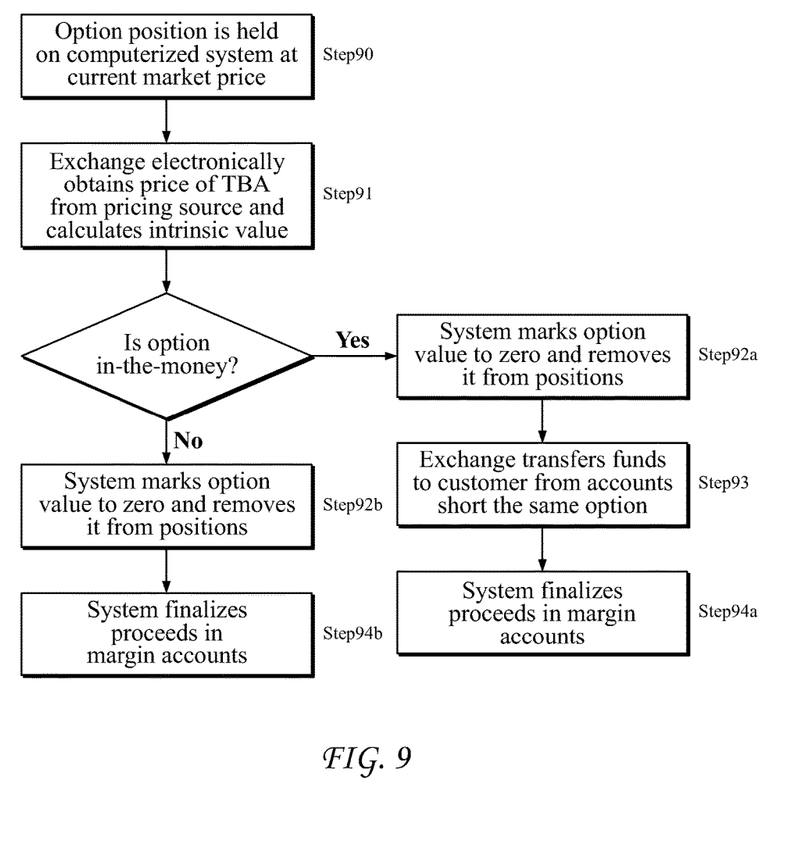
FIG. 9 is a flowchart showing actions undertaken by a computer system to manage proposed contract at time of option expiration according to an aspect of the invention of the present disclosure.

FIGS. 7-9 are flowcharts showing a detailed description of the processes that may be undertaken in connection with execution of the invention with the exchanges computer networks, systems and databases. It shows activities that take place at three stages: At the time the option is purchased in FIG. 7; the time between the option's purchase and its expiration (which are undertaken daily) in FIG. 8; and at expiration in FIG. 9.

FIG. 7 is a flowchart showing initial stages of actions undertaken by a computer system to trade and manage proposed contracts. In Step 70: Customer seeking to trade TBA options sets up computer-managed margin and position accounts with the exchange and deposits cash in the margin account. In Step 71: Exchange receives an order from a customer to buy/sell TBA option. In Step 72: Exchange's computers look for offsetting orders to sell/buy TBA option at same price. If an offsetting order is found, the trade is executed by the system, and both parties are notified of the trade. In Step 73: If no offsetting order at the same price exists, the order is posted on the computer-driven on-line trading system. In Step 74: If order is executed, both parties are notified electronically. In Step 75: The exchange's computer system posts the trade on its notification database. In Step 76: Add trades to the computerized accounts of both parties to trade. In Step 77: Exchange electronically transfers proceeds from TBA option buyer to seller. Exchange's computer systems ensure that sufficient funds are left in margin account to meet margin requirements. In Step 78: If order is not executed, exchange waits until order is cancelled by customer or expires. In Step 79: Remove order from on-line trading system.

FIG. 8 is a flowchart showing actions undertaken by a computer system to manage proposed contract between trade day and option expiration. In Step 80: Option position (either long or short) is marked to market daily by exchange's computer system. In Step 81: If customer's account made a profit, exchange adds value of profit to margin account's balance. In Step 82: If customer's account lost money, exchange removes money from the customer's margin account; exchange also ensures that available margin meets required amount. In Step 83: If customer long the option requests that the option is exercised, the exchange's computer system obtains the price of the associated TBA and calculates the option's intrinsic value (i.e., the difference between the strike and market prices of the applicable TBAs). In Step 84: The exchange electronically transfers funds representing the intrinsic value from accounts that are short the same option. In Step 85(a): The option is removed from the customers' positions. In Step 85(b): the exchange automatically notifies the customer short the option of the exercise. In Step 85(c): Exchange's computer system finalizes proceeds in margin accounts. In Step 86: If the option is not exercised, the exchange does nothing.

FIG. 9 is a flowchart showing actions undertaken by a computer system to manage proposed contract at time of option expiration. In Step 90: Option position is held on exchange's computerized account system at current market price. In Step 91: Exchange electronically obtains the pricing of TBA from pricing source and calculates intrinsic value. In Step 92(a) and (b): Exchange marks option price to zero and removes from positions. In Step 93: If option is in-the-money, exchange electronically transfers money representing intrinsic value to customers from customers that are short the same option. In Step 94(a) and (b): Exchange's computer system finalizes proceeds in margin accounts.

Figure 10:
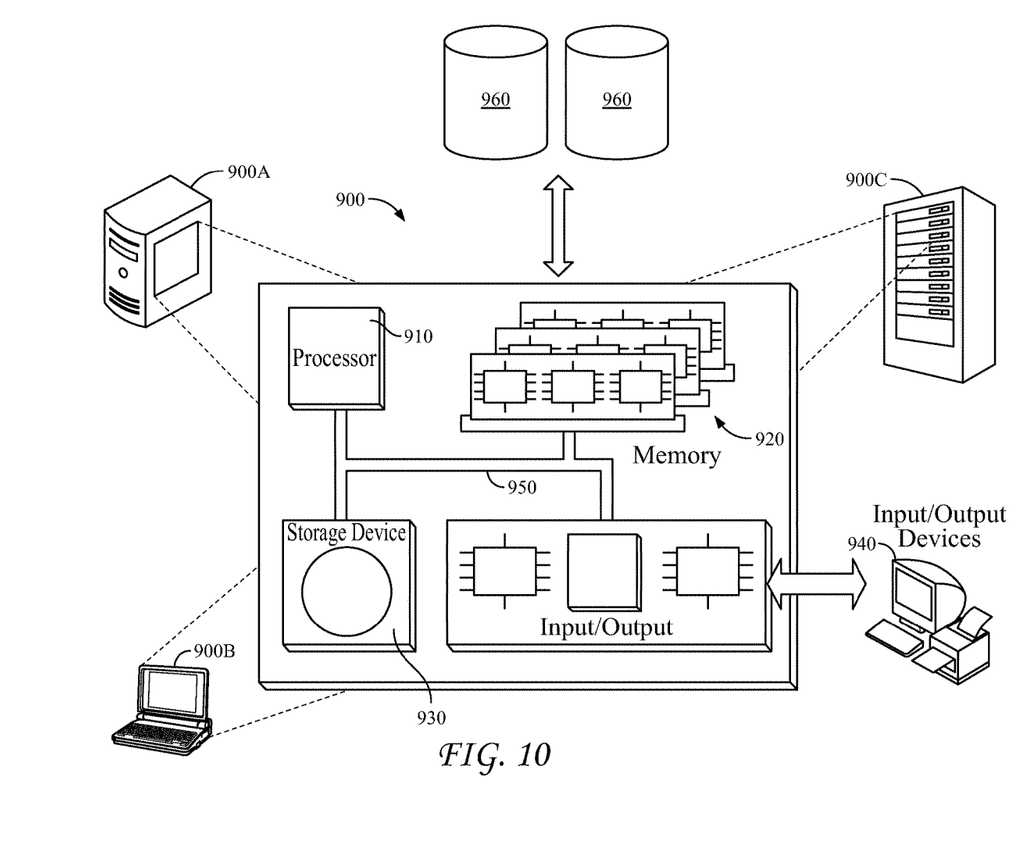
FIG. 10 is a functional block diagram of a general-purpose computing system on which the present embodiments may be implemented according to various aspects of the present disclosure.

FIG. 10 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers.

The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The invention claimed is:

1. A computer-implemented method for creating, centrally clearing, and settling an option on a TBA mortgage-backed securities forward contract ("TBA option") through a centralized trading platform and central clearinghouse that eliminates the need for delivering or exchanging the TBA mortgage-backed securities forward contract referenced by the TBA option or any mortgage-backed securities upon exercise of the option, the method comprising:

a) using a computer processor in communication with the memory of the centralized trading platform, electronically automatically storing long and short positions in the TBA option at a current market price as determined from price quotes input by a market participant offering to buy the TBA option and a market participant offering to sell the TBA option via a market participant graphical user interface in communication with the memory of the centralized trading platform and provided by the centralized trading platform and posted on the centralized trading platform;

b) using a computer processor in communication with the memory of the centralized trading platform, electronically automatically determining that long and short positions in the TBA option will not expire that day;

c) using the computer processor in communication with memory of the centralized trading platform, electronically automatically determining a TBA option position is marked to market daily, where the TBA option position is long or short;

d) using the computer processor in communication with memory of the centralized trading platform, electronically automatically determining the TBA option position increased in value by a given amount on a given day and adding the increased value to the customer's margin account;

e) using the computer processor in communication with memory of the centralized trading platform, electronically automatically determining the TBA option position decreased in value by a given amount on a given day and subtracting the decreased value from the customer's margin account, and when funds in the margin account are below a predetermined margin requirement, requesting through an electronically automated notification system that the customer deposit additional funds in the margin account;

f) upon receiving at memory of the electronic trading platform a request to exercise the TBA option from a customer long the TBA option through an account management graphical user interface;

f1) using the computer processor memory in communication with an external pricing source connected through a network, obtaining a price for the TBA mortgage-backed securities forward contract referenced by the TBA option from an external pricing source;

f2) using the computer processor in communication with the memory of the centralized trading platform, electronically automatically calculating an intrinsic value of the TBA option based on the price of the TBA mortgage-backed securities forward contract referenced by the TBA option and other specifications associated with the TBA option;

f3) using the computer processor in communication with the memory of the centralized trading platform, electronically automatically adjusting margin accounts of the customers long and short the exercised TBA option by reducing the mark to market value of the TBA option to zero;

f4) using the computer processor in communication with the memory of the centralized trading platform, electronically automatically transferring money representing the intrinsic value of the TBA option, less any associated costs, to the margin account of the customer long the exercised TBA option directly from the margin account of a customer short the exercised TBA option when the intrinsic value of the TBA option is greater than zero;

f5) using the computer processor in communication with the memory of the centralized trading platform, electronically automatically removing the TBA option position from the position accounts of the customer long the exercised TBA option and the customer short the exercised TBA option;

f6) using a computer processor in communication with the memory of the centralized trading platform, electronically automatically notifying the customer short the TBA option of the request to exercise the TBA option by the customer long the TBA option, electronically automatically finalizing proceeds in the margin account of the customer long the TBA option and the margin account of the customer short the TBA option, and notifying customers of the changes to the proceeds in the margin accounts and the updated proceeds in the margin account.

2. A computer-implemented method for creating, centrally clearing, and settling an option on a TBA mortgage-backed securities forward contract ("TBA option") through a centralized trading platform and central clearinghouse that eliminates the need for delivering or exchanging the TBA mortgage-backed securities forward contract referenced by the TBA option or any mortgage-backed securities upon exercise of the option, the method comprising:

a) using a computer processor in communication with the memory of the centralized trading platform, electronically automatically storing long and short positions in the TBA option at a current market price as determined from price quotes input by a market participant offering to buy the TBA option and a market participant offering to sell the TBA option via a market participant graphical user interface in communication with the memory of the centralized trading platform and provided by the centralized trading platform and posted on the centralized trading platform;

b) using a computer processor in communication with the memory of the centralized trading platform, electronically automatically determining that the TBA option will expire that day;

c) using a computer processor in communication with the memory of the centralized trading platform, electronically automatically obtaining the price of the TBA mortgage-backed securities forward contract referenced by the TBA option at the close of that day's trading from a pricing source connected through a network;

d) using a computer processor in communication with the memory of the centralized trading platform, electronically automatically calculating an intrinsic value of the TBA option based on the price of the TBA mortgage-backed securities forward contract referenced by the TBA option and other specifications associated with the TBA option and determining the TBA option has an intrinsic value greater than zero, then    d1) using a computer processor in communication with the memory of the centralized trading platform, electronically automatically marking the TBA option position in the margin accounts of the customer long the TBA option and the customer short the TBA option to a market price of zero and removing the TBA option from the position accounts of the customer long the TBA option and the customer short the TBA option;

d2) using a computer processor in communication with the memory of the centralized trading platform, electronically automatically transferring money representing the intrinsic value of the TBA option, less any associated costs, to the margin account of the customer long the TBA option directly from the margin account of a customer short the TBA option and electronically automatically notifying the customers long and short the TBA option of the money transfer;

d3) using a computer processor in communication with the memory of the centralized trading platform, electronically automatically finalizing proceeds in the margin accounts of the customer long the TBA option and the customer short the TBA option and electronically automatically notifying the customers long and short the TBA option of the updated final proceeds in the margin accounts;

e) using a computer processor in communication with the memory of the centralized trading platform, electronically automatically calculating an intrinsic value of the TBA option and determining the TBA option has an intrinsic value less than or equal to zero, then e1) using a computer processor in communication with the memory of the centralized trading platform, electronically automatically adjusting the margin accounts of the customer long the TBA option and the customer short the TBA option by marking the TBA option position to a market price of zero and removing the TBA option from the position accounts of the customer long the TBA option and the customer short the TBA option; and e2) using a computer processor in communication with the memory of the centralized trading platform, electronically automatically finalizing proceeds in the margin accounts of the customer long the TBA option and the customer short the TBA option and electronically automatically notifying the customers long and short the TBA option of the updated final proceeds in the margin accounts.

\* \* \* \* \*